(12) United States Patent
Adachi (10) Patent No.: US 8,318,051 B2
(45) Date of Patent: *Nov. 27, 2012

(54) LIGHT-ABSORBENT RESIN COMPOSITION FOR LASER WELDING, LIGHT-ABSORBENT RESIN MOLDING, AND METHOD FOR MANUFACTURING LIGHT-ABSORBENT RESIN MOLDING

(75) Inventor: Kenji Adachi, Ichikawa (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 45 days.

This patent is subject to a terminal disclaimer.

(21) Appl. No.: 11/984,189

(22) Filed: Nov. 14, 2007

(65) Prior Publication Data

US 2008/0116426 A1    May 22, 2008

(30) Foreign Application Priority Data

Nov. 22, 2006   (JP) ................. 2006-316351

(51) Int. Cl.
*F21V 9/00* (2006.01)
*G02B 5/02* (2006.01)
*G02C 7/10* (2006.01)
*G02F 1/361* (2006.01)
*G03B 11/00* (2006.01)
*B32B 1/00* (2006.01)
*B32B 3/00* (2006.01)
*C08K 3/10* (2006.01)

(52) U.S. Cl. ............ 252/582; 156/272.8; 252/587; 264/294; 428/174; 428/323; 428/328; 428/412; 428/425.9; 428/474.4; 428/480; 428/500; 524/403; 524/404

(58) Field of Classification Search ............ 252/582, 252/587; 428/328, 480, 174, 323, 412, 500, 428/425.9, 474.4; 156/272.8; 264/294; 524/403, 524/404

See application file for complete search history.

(56) References Cited

U.S. PATENT DOCUMENTS

2006/0008640 A1 * 1/2006 Chonan et al. ............... 428/328
2010/0178471 A1 * 7/2010 Adachi .......................... 428/174

FOREIGN PATENT DOCUMENTS

| JP | A-2004-148800 | | 5/2004 |
| JP | 2005-239932 | * | 9/2005 |
| JP | A-2005-290087 | | 10/2005 |
| WO | WO 2005/084955 A1 | | 9/2005 |
| WO | WO 2005/087680 A1 | * | 9/2005 |

* cited by examiner

Primary Examiner — Bijan Ahvazi
(74) Attorney, Agent, or Firm — Oliff & Berridge, PLC (57) ABSTRACT

The present invention provides a light-absorbent resin composition for laser welding whereby transparency can be maintained and stable laser welding is possible. The light-absorbent resin composition for laser welding includes a resin and laser-light-absorbent nanoparticles, wherein the laser-light-absorbent nanoparticles are nanoparticles of tungsten oxide indicated by the general formula $W_yO_z$, and/or nanoparticles of composite tungsten oxide indicated by the general formula $M_xW_yO_z$.

9 Claims, 2 Drawing Sheets

FIG. 1

| | LASER-LIGHT-ABSORBENT MICROPARTICLES | CONTENT RATIO OF LASER-LIGHT-ABSORBENT MICROPARTICLES (g/m²) | PARTICLE DIAMETER OF LASER-LIGHT-ABSORBENT MICROPARTICLES (nm) | THERMOPLASTIC RESIN | APPEARANCE OF LASER-WELDED BOND PART | BOND STRENGTH | VISIBLE LIGHT TRANSMITTANCE (%) | 940 nm TRANSMITTANCE (%) |
|---|---|---|---|---|---|---|---|---|
| Example 10 | $WO_{2.72}$ | 0.9 | 137 | ACRYLIC | GOOD | ○ | 85 | 42 |
| Example 11 | $WO_2$ | 0.9 | 113 | ACRYLIC | GOOD | ○ | 34 | 27 |
| Example 12 | $Cs_{0.33}WO_3$ | 0.9 | 92 | POLYCARBONATE | GOOD | ○ | 85 | 33 |
| Example 13 | $Cs_{0.33}WO_3$ | 3.4 | 92 | POLYCARBONATE | GOOD | ○ | 63 | 2 |
| Example 14 | $Cs_{0.20}WO_3$ | 0.96 | 105 | POLYCARBONATE | GOOD | ○ | 79 | 34 |
| Example 15 | $Cs_{0.25}WO_3$ | 0.96 | 88 | POLYCARBONATE | GOOD | ○ | 83 | 35 |
| Example 16 | $Rb_{0.33}WO_3$ | 0.84 | 76 | ACRYLIC | GOOD | ○ | 85 | 29 |
| Example 17 | $Tl_{0.33}WO_3$ | 0.9 | 69 | ACRYLIC | GOOD | ○ | 84 | 39 |
| Example 18 | $Na_{0.33}WO_3$ | 0.9 | 94 | POLYETHYLENE TEREPHTHALATE | GOOD | ○ | 79 | 18 |
| Example 19 | $Na_{0.75}WO_3$ | 0.48 | 121 | POLYETHYLENE TEREPHTHALATE | GOOD | ○ | 56 | 4 |
| Example 20 | $WO_2$ | 0.96 | 865 | POLYSTYRENE | GOOD | ○ | 30 | 32 |
| Example 21 | $WO_{2.72}$ | 0.96 | 238 | POLYAMIDE | GOOD | ○ | 71 | 35 |
| Example 22 | $WO_{2.72}$ | 1.44 | 165 | POLYSTYRENE | GOOD | ○ | 48 | 18 |
| Example 23 | $WO_{2.72}$ | 1.2 | 137 | ETHYLENE-TETRAFLUOROETHYLENE COPOLYMER | GOOD | ○ | 53 | 28 |
| Example 24 | $Cs_{0.33}WO_3$ | 1.6 | 92 | ACRYLIC | GOOD | ○ | 71 | 6 |
| Example 25 | $Cs_{0.33}WO_3$ | 2.7 | 98 | ACRYLIC | GOOD | ○ | 65 | 2 |
| Comparative Example 4 | $WO_3$ | 1.2 | 110 | ACRYLIC | NO WELDING | ×× | 84 | 92 |
| Comparative Example 5 | ITO | 28.8 | 140 | ACRYLIC | GOOD | × | 88 | 73 |
| Comparative Example 6 | $WO_{2.72}$ | 1.2 | 1200 | ACRYLIC | GOOD | × | 70 | 75 |
| Comparative Example 7 | $Cs_{0.33}WO_3$ | 34.8 | 92 | ACRYLIC | BUBBLING | ○ | 12 | 0 |
| Comparative Example 8 | $Cs_{0.33}WO_3$ | 0.9 | — | ACRYLIC | IRREGULAR COLORATION | × | 88 | 52 |

IN THE BOND STRENGTH COLUMN, ○: ADEQUATE STRENGTH;
×: INADEQUATE STRENGTH; AND
××: WELDING IMPOSSIBLE.

FIG. 2

LIGHT-ABSORBENT RESIN COMPOSITION FOR LASER WELDING, LIGHT-ABSORBENT RESIN MOLDING, AND METHOD FOR MANUFACTURING LIGHT-ABSORBENT RESIN MOLDING

BACKGROUND OF THE INVENTION

1. Field of the Invention

The present invention relates to a light-absorbent resin composition for laser welding that is used when a plastic member is joined by a laser welding method, to a light-absorbent resin molding, and to a method for manufacturing a light-absorbent resin molding. The present invention more specifically relates to a light-absorbent resin composition for laser welding that has thermal stability not found in the conventional organic-based light-absorbing agent, and that imparts transparency and light-transmitting properties to a plastic member after laser welding that could not be obtained using a conventional carbon-based light-absorbing agent, to a light-absorbent resin molding, and to a method for manufacturing a light-absorbent resin molding.

2. Description of the Related Art

Instances in which a laser welding method is used as a method for bonding a thermoplastic resin have increased in recent years. A reason for this is considered to be that the use of the laser welding method has advantages in that an easily stabilized bond that is free of vibration can be formed even in a member having a fine complex bond interface, weld flash and smoke do not occurs, the appearance of the bonded product is enhanced, and the degree of freedom in the design of the bonded part is increased.

In the laser welding method, one of the plastic members to be bonded is usually composed of a light-transmissive resin molding, and the other plastic member is composed of a light-absorbent resin molding that absorbs laser light and generates heat.

When a laser is radiated to this plastic member from the direction of the light-transmissive resin molding, the light-absorbent resin molding first melts, and then heat is transmitted from the periphery of the molten light-absorbent resin molding to the light-transmissive resin molding to cause melting, and bonding occurs.

An Nd: YAG laser having a wavelength of 1064 nm or a semiconductor laser having a wavelength of 800 to 1000 nm is mainly used as the laser light source, and a material that efficiently absorbs near-infrared wavelengths of 800 to 1200 nm is therefore used as the light-absorbent resin composition for laser welding.

Known resin compositions that are used as the abovementioned light-absorbent resin composition for laser welding are resin compositions that contain as organic compounds phthalocyanine-based compounds, cyanine-based compounds, aminium-based compounds, immonium-based compounds, squalium-based compounds, polymethine-based compounds, anthraquinone-based compounds, and azo-based compounds, or as inorganic compounds, carbon black (see Japanese Laid-open Patent Application No. 2004-148800).

In Japanese Laid-open Patent Application No. 2005-290087, a light-absorbent resin composition for laser welding is proposed in which copper phosphonate having an aromatic ring, and metallic elements, salts, oxides, hydroxides, and the like are added in order to enhance sensitivity to the laser. Specific examples of the metal oxides included in the proposed resin composition include silicon oxide, titanium oxide, aluminum oxide, iron oxide, magnesium oxide, zinc oxide, cobalt oxide, lead oxide, tin oxide, antimony oxide, indium oxide, manganese oxide, molybdenum oxide, nickel oxide, copper oxide, palladium oxide, lanthanum oxide, antimony-doped tin oxide (ATO), indium-doped tin oxide (ITO), and the like.

In International Patent Publication WO 2005/084955 pamphlet A1, a light-absorbent resin composition for laser welding is proposed in which tin-doped indium oxide (ITO) and antimony-doped tin oxide (ATO) are added as inorganic-based materials having light absorbing capability in the laser wavelength region.

SUMMARY OF THE INVENTION

However, the inventors have learned that the organic light-absorbent resin composition for laser welding (laser-light-absorbent material) described in Japanese Laid-open Patent Application No. 2004-148800 generally has a narrow wavelength range of absorbance, and a relatively large amount thereof must be added in order to obtain adequate heat generation. The laser-light-absorbent material also has poor thermal stability, melting occurs in conjunction with heat generation, and there are cases in which a uniform stable bond is not obtained under certain laser irradiation conditions.

The inorganic-based carbon material described in Japanese Laid-open Patent Application No. 2004-148800 has high thermal stability. However, the plastic member is colored black due to the absorbance in the wavelength region of visible light, and this coloration is a drawback in a member in which darkening of the bonded part is undesirable, or when a transparent plastic bonded member is desired. Demand for transparent, colorless bonds is increasing in fields such as medicine. Carbon black also aggregates easily, and drawbacks occur whereby the heat generation due to laser light absorbance becomes uneven, partial irregularities in welding occur, partial blistering occurs, and the welding time increases when aggregation and irregularity in the state of dispersion in the host resin occur.

The light-absorbent resin composition for laser welding described in Japanese Laid-open Patent Application No. 2005-290087 in which copper phosphonate having an aromatic ring, and metallic elements, salts, oxides, hydroxides, and the like are added has inadequate sensitivity to laser light, and a large quantity of the composition must be added in order to obtain a problem-free bond. However, the addition of a large quantity of the composition can alter the basic physical properties of the resin molding itself and can lead to reduced mechanical strength and other drawbacks. Most of the above-mentioned compositions also absorb light in the visible wavelength region, and severe coloration of the plastic members is also cited as a drawback.

The light-absorbent resin composition for laser welding described in International Patent Publication WO 2005/084955 in which tin-doped indium oxide (ITO) and antimony-doped tin oxide (ATO) are added has excellent transparency/clarity, but the infrared absorbance per unit weight is significantly lower than carbon and the like. Since absorbance begins from the relatively long near-infrared wavelengths of 1000 nm or greater, the absorbance at the semiconductor laser wavelengths of 800 to 1000 nm or the Nd: YAG laser wavelength of 1064 nm is essentially extremely low. A large quantity of the composition must therefore be added to the plastic members in order to perform appropriate laser welding. However, the addition of large quantities of the composition not only alters the basic physical properties of the members, but also increases cost limitations. Resource and cost problems are particularly significant in the case of ITO.

The present invention was developed in view of the foregoing drawbacks, and an object of the present invention is to provide a light-absorbent resin composition for laser welding whereby heat is uniformly generated from the laser light, stable laser welding is possible, and the transparency of the welded portion can be maintained, to provide a light-absorbent resin molding, and to provide a method for manufacturing a light-absorbent resin molding.

MEANS USED TO SOLVE THE AFOREMENTIONED PROBLEMS

As a result of concentrated investigation aimed at overcoming the drawbacks described above, the inventors discovered that the following characteristics are needed in a light-absorbent resin composition for laser welding:

1. the composition has a high absorption coefficient and high absorption throughout the 800 to 1200 nm range of near-infrared wavelengths near the wavelength region of the laser;

2. the composition has minimal absorption in the visible wavelength range of 380 to 780 nm; and 3. the composition has high solubility or dispersion properties of the light-absorbent material with respect to the host resin.

The inventors therefore researched a light-absorbent resin composition for laser welding that has high absorption throughout the near-infrared wavelength region of 800 to 1200 nm as the wavelength region of the laser light used for laser welding, and adequately low absorption of visible light, thereby enabling transparency to be maintained, and that enables uniform heat generation by the laser light and stable laser welding without compromising the transparent appearance of the welded portion. The inventors also researched a light-absorbent resin molding and a method for manufacturing a light-absorbent resin molding.

As a result of the research, the inventors developed the present invention upon discovering that a light-absorbent resin composition for laser welding that significantly absorbs light in the wavelength region of an Nd: YAG laser or a semiconductor laser to facilitate laser welding, and that substantially transmits light in the visible wavelength region and enables the transparency of the molding to be maintained is obtained through the use of nanoparticles of tungsten oxide indicated by the general formula $W_yO_z$ and/or nanoparticles of composite tungsten oxide indicated by the general formula $M_xW_yO_z$ as laser-light-absorbent nanoparticles in a light-absorbent resin composition for laser welding that includes laser-light-absorbent nanoparticles and a polymer dispersing agent having a glass transition temperature of 30° C. or higher.

In the nanoparticles of tungsten oxide indicated by the abovementioned general formula $W_yO_z$, W is tungsten, O is oxygen, and $2.0 \leq z/y < 3.0$.

In the nanoparticles of composite tungsten oxide indicated by the abovementioned general formula $M_xW_yO_z$, M is one or more types of elements selected from H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1$; and $2.0 < z/y \leq 3.0$.

The nanoparticles of tungsten oxide indicated by the general formula $W_yO_z$ and the nanoparticles of composite tungsten oxide indicated by the general formula $M_xW_yO_z$ are considered to exhibit the abovementioned characteristics due to having large quantities of free electrons, and because the plasmon excitation wavelengths thereof are in the near-infrared region.

Specifically, a first aspect of the present invention provides a light-absorbent resin composition for laser welding, comprising laser-light-absorbent nanoparticles and a polymer dispersing agent that has a glass transition temperature of 30° C. or higher, wherein the laser-light-absorbent nanoparticles are at least one of nanoparticles of tungsten oxide indicated by the general formula $W_yO_z$ (wherein W is tungsten, O is oxygen, and $2.0 \leq z/y < 3.0$) and nanoparticles of composite tungsten oxide indicated by the general formula $M_xW_yO_z$ (wherein M is one or more types of elements selected from H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1$; and $2.0 < z/y \leq 3.0$).

A second aspect of the present invention provides the light-absorbent resin composition for laser welding according to the first aspect, wherein an average grain size of the tungsten oxide or composite tungsten oxide nanoparticles is 1000 nm or less.

A third aspect of the present invention provides a light-absorbent resin molding molded by a process in which the light-absorbent resin composition for laser welding according to the first or second aspect is diluted by a thermoplastic resin and the polymer dispersing agent included in the light-absorbent resin composition for laser welding, and kneaded, wherein a content ratio of the nanoparticles of tungsten oxide or composite tungsten oxide in a region that is 3 mm or less from a surface and that constitutes a surface layer of the light-absorbent resin molding is 0.01 g/m² or higher and 32 g/m² or less.

A fourth aspect of the present invention provides the light-absorbent resin molding according to the third aspect, comprising a light-absorbent resin molding molded by a process in which the light-absorbent resin composition for laser welding according to the first or second aspect is diluted by a thermoplastic resin and the polymer dispersing agent included in the light-absorbent resin composition for laser welding, and kneaded; wherein the molded light-absorbent resin molding is in the shape of a plate or a film.

A fifth aspect of the present invention provides the light-absorbent resin molding according to any of the third through fourth aspects, wherein the thermoplastic resin is one or more types of resin selected from the group that includes acrylic resin, polycarbonate resin, styrene resin, low-density polyethylene resin, polypropylene resin, polyurethane resin, polyamide resin, polyethylene terephthalate resin, polybutylene terephthalate resin, and fluororesin.

A sixth aspect of the present invention provides a light-absorbent resin molding in which the light-absorbent resin composition for laser welding according to the first or second aspect is diluted by a binder and applied as a coating on a surface of a substrate.

A seventh aspect of the present invention provides a light-absorbent resin molding in which the light-absorbent resin molding according to any of the third through sixth aspects an absorbance maximum at a wavelength of 600 to 1800 nm.

An eighth aspect of the present invention provides a method for manufacturing a light-absorbent resin molding that is formed by a process in which a light-absorbent resin composition for laser welding that includes laser-light-absorbent nanoparticles and a polymer dispersing agent having a glass transition temperature of 30° C. or higher is diluted by a thermoplastic resin and the polymer dispersing agent included in the light-absorbent resin composition for laser welding, and kneaded; wherein the method for manufacturing a light-absorbent resin molding comprises:

using the polymer dispersing agent and the thermoplastic resin to dilute the light-absorbent resin composition for laser welding in which the laser-light-absorbent nanoparticles are at least one of nanoparticles of tungsten oxide indicated by the general formula $W_yO_z$ (wherein W is tungsten, O is oxygen, and $2.0 \leq z/y < 3.0$) and nanoparticles of composite tungsten oxide indicated by the general formula $M_xW_yO_z$ (wherein M is one or more types of elements selected from H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1$; and $2.0 < z/y \leq 3.0$) so that the content ratio of the nanoparticles of tungsten oxide or composite tungsten oxide in a region that is 3 mm or less from a surface and that constitutes a surface layer of the light-absorbent resin molding is 0.01 g/m² or higher and 32 g/m² or less; and performing kneading and molding to manufacture the light-absorbent resin molding.

According to the present invention, nanoparticles of tungsten oxide indicated by the general formula $W_yO_z$ (wherein W is tungsten, O is oxygen, and $2.0 \leq z/y < 3.0$) and/or nanoparticles of composite tungsten oxide indicated by the general formula $M_xW_yO_z$ (wherein M is one or more types of elements selected from H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1$; and $2.0 < z/y \leq 3.0$) are used as laser-light-absorbent nanoparticles, and the light-absorbent resin composition for laser welding that includes laser-light-absorbent nanoparticles and a polymer dispersing agent having a glass transition temperature of 30° C. or higher is in the form of a solid powder in which the nanoparticles are dispersed to a high degree in the polymer dispersing agent.

As a result of the composition described above, the light-absorbent resin composition for laser welding enables a laser-light-absorbent resin molding to easily be molded, and significantly absorbs light in the wavelength region of an Nd: YAG laser or a semiconductor laser to enable easy laser welding, while substantially transmitting light in the visible wavelength region to enable transparency of the molding to be maintained and a minimally colored, transparent weld interface to be obtained. The range of laser welding applications is therefore increased, and excellent thermal stability is obtained, and a stable bond between plastic members can therefore be provided that is extremely useful commercially.

BRIEF DESCRIPTION OF THE DRAWINGS

FIG. 2 is a table showing the general composition and the characteristics of the light-absorbent resin moldings according to Examples 10 through 25 and Comparative Examples 4 through 8.

DESCRIPTION OF THE PREFERRED EMBODIMENTS

Embodiments of the present invention will be described hereinafter with reference to the drawings.

A characteristic feature of the light-absorbent resin composition for laser welding that includes laser-light-absorbent nanoparticles and a polymer dispersing agent having a glass transition temperature of 30° C. or above according to the present embodiment is that the laser-light-absorbent nanoparticles are nanoparticles of tungsten oxide indicated by the general formula $W_yO_z$ (wherein W is tungsten, O is oxygen, and $2.0 \leq z/y < 3.0$) (sometimes abbreviated hereinafter as "tungsten oxide indicated by the general formula $W_yO_z$") and/or nanoparticles of composite tungsten oxide indicated by the general formula $M_xW_yO_z$ (wherein M is one or more types of elements selected from H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001 \leq x/y \leq 1$; and $2.0 < z/y \leq 3.0$) (sometimes abbreviated hereinafter as "tungsten oxide indicated by the general formula $M_xW_yO_z$")

The laser-light-absorbent nanoparticles of the present embodiment are inorganic nanoparticles that are capable of absorbing light in the laser light wavelength region, and are nanoparticles in which a large quantity of free electrons is retained and in which plasma resonant oscillation occurs. When laser light is incident on the abovementioned nanoparticles, free electrons are excited according to the frequency of the light, collective oscillation of electrons occurs, and energy is absorbed or radiated. The absorption wavelength at this time depends on the density of free electrons or the effective mass of the electrons, and certain types of nanoparticles have a plasma absorption wavelength in the vicinity of 800 to 1200 nm as the wavelength range of Nd: YAG laser or semiconductor laser light. When an electron energy loss spectroscopy method (EELS) having high energy resolution is used, the energy loss peak due to plasmon excitation can be directly observed.

Specific examples of the laser-light-absorbent nanoparticles of the present embodiment include nanoparticles of tungsten oxide indicated by the general formula $W_yO_z$, and/or nanoparticles of composite tungsten oxide indicated by the general formula $M_xW_yO_z$. Tungsten oxide nanoparticles or composite tungsten oxide nanoparticles indicated by the abovementioned general formulae can be used to obtain the desired laser-light absorption characteristics.

Specifically, the abovementioned laser-light-absorbent nanoparticles have an absorption maximum at a wavelength of 600 to 1800 nm when the dispersed nanoparticles have an adequately small size. The nanoparticles have an adequately large absorption coefficient in wavelengths near the maximum, and therefore adequately absorb laser light in the wavelength range of 800 to 1200 nm and generate heat.

The content ratio of oxygen with respect to tungsten is preferably 2.0 or higher and less than 3.0 in the case of the tungsten oxide nanoparticles indicated by the general formula $W_yO_z$ as the laser-light-absorbent nanoparticles. When the z/y value is 2.0 or higher, a stable $WO_2$ crystal phase or various types of Magneli phase oxides occur in the laser-light-absorbent nanoparticles, infrared plasmon absorption occurs, and a chemically stable material can be obtained that is therefore applicable as effective laser-light-absorbent nanoparticles. When the z/y value is less than 3.0, the necessary amount of free electrons are generated, and efficient laser-light-absorbent nanoparticles are obtained.

Tungsten oxide nanoparticles indicated by the general formula $W_yO_z$ are more preferred as the laser-light-absorbent nanoparticles, because the Magneli phase having a composition ratio indicated by the relation $2.45 \leq z/y \leq 2.99$ is chemically stable, and the nanoparticles have good absorption characteristics in the near-infrared region. Examples include $W_{18}O_{49}$, $W_{20}O_{58}$, $W_4O_{11}$, and the like.

The composite tungsten oxide used in the present embodiment is in the form of composite tungsten oxide nanoparticles indicated by the general formula $M_xW_yO_z$, and since an adequate quantity of free electrons are generated therein, the composite tungsten oxide functions effectively as a near-infrared absorbing component of the laser-light-absorbent nanoparticles.

The nanoparticles of composite tungsten oxide indicated by the general formula $M_xW_yO_z$ have excellent durability when the nanoparticles have a hexagonal, tetragonal, or cubic crystal structure, and the nanoparticles therefore preferably include one or more crystal structures selected from hexagonal, tetragonal, and cubic crystal structures. Furthermore, in the case of composite tungsten oxide nanoparticles having a hexagonal crystal structure, for example, the composite tungsten oxide nanoparticles may include one or more types of elements selected from Cs, Rb, K, Tl, In, Ba, Li, Ca, Sr, Fe, and Sn as preferred M elements.

At this time, the added quantity x of the M element in terms of the value of x/y is preferably 0.001 or greater, and 1.0 or less, and more preferably near 0.33. The reason for this is that the value of x that is theoretically computed from a hexagonal crystal structure is 0.33, and preferred optical characteristics are obtained when the added quantity is near 0.33. The quantity of oxygen present in terms of the value of z/y is preferably 2.0 or more and 3.0 or less. Typical examples may include $Cs_{0.33}WO_3$, $Rb_{0.33}WO_3$, $K_{0.33}WO_3$, $Ba_{0.33}WO_3$, and the like, but useful near-infrared absorption characteristics can be obtained when y and z are within the abovementioned ranges.

The composite tungsten oxide nanoparticles described above may be used alone, but the use of a mixture of two or more types thereof is preferred. According to experimentation by the inventors, since the abovementioned laser-light-absorbent nanoparticles have an absorption maximum at a wavelength of 600 to 1600 nm in a composition in which the nanoparticles are adequately small and uniformly dispersed, the nanoparticles have an adequately large absorption coefficient at wavelengths near the maximum, and therefore generate heat and adequately absorb laser light in the wavelength range of 800 to 1200 nm.

Considering that the wavelength of visible light is 380 to 780 nm, and visibility is indicated by a bell curve having a peak near a wavelength of 550 nm, it is understandably that visible light is effectively transmitted in such a film, and light in other wavelengths is effectively absorbed.

The laser-light-absorbent nanoparticles used in the present embodiment may have any grain size insofar as the laser-light-absorbent nanoparticles function as a laser-light-absorbent component, but the grain size is preferably 1000 nm or less, and more preferably 200 nm or less. The reason is that when the particle diameter is 1000 nm or less, the nanoparticles or the coarse aggregate particles in which the nanoparticles are aggregated do not cause light scattering in the molded light-absorbent resin molding, and the transparent molding after laser welding has an unclouded, transparent appearance. Since the attenuation caused by laser light absorption is also minimal when the particle diameter is 1000 nm or less, a particle diameter of 1000 nm or less is preferred.

The laser-light-absorbent nanoparticles used in the present embodiment are not completely transparent in the visible light region, and have some degree of coloration according to the type or particle diameter of the nanoparticles, the state of dispersion or aggregation, and other factors. The amount of light scattered by the nanoparticles is reduced by reducing the nanoparticle size or more uniformly dispersing the nanoparticles, and when the nanoparticles are uniformly dispersed and have an average nanoparticle diameter of 200 nm or less, for example, the nanoparticles are in a Rayleigh scattering mode, and a collection of the nanoparticles is transparent to visible light even in the case of a black material that does not transmit visible light.

The state of dispersion of the laser-light-absorbent nanoparticles in the thermoplastic resin as the host is extremely important in determining the characteristics of the light-absorbent resin molding. When the nanoparticles are adequately dispersed without aggregation, the final color state of the light-absorbent resin molding is uniform, and the region of heating caused by laser irradiation is uniform, and the outward appearance after welding is therefore satisfactory. In contrast, when the nanoparticles are aggregated and not adequately dispersed in the thermoplastic resin as the host, not only is the final color state non-uniform, but the region of heating caused by laser irradiation is also uneven. Localized bubbling and defects in appearance of the light-absorbent resin molding are also caused by the uneven heating region.

The steps described below are preferably performed in order to prevent localized bubbling or appearance defects in the light-absorbent resin molding.

(1) A liquid dispersion is manufactured in which the laser-light-absorbent nanoparticles are uniformly dispersed together with a dispersing agent in a solvent.

(2) The solvent is removed from the liquid dispersion by heating using a vacuum dryer, a hot-air dryer, a Henschel mixer, or other hot mixer to manufacture the light-absorbent resin composition for laser welding.

(3) The manufactured light-absorbent resin composition for laser welding is diluted with the dispersing agent and the thermoplastic resin, kneaded, and molded to manufacture the desired light-absorbent resin molding.

The inventors discovered the importance of the fact that the final dispersion state of the laser-light-absorbent nanoparticles in the light-absorbent resin molding obtained in step (3) depends significantly on the dispersion state obtained in the manufacturing of the nanoparticle dispersion in step (1), and of the fact that the high degree of dispersion achieved in the nanoparticle dispersion of step (1) is also maintained in the light-absorbent resin composition for laser welding obtained in step (2) as an easily handled solid powder.

The inventors therefore studied the dispersing agent used for the laser-light-absorbent nanoparticles in the preparation of the nanoparticle dispersion in step (1). As a result of concentrated investigation, the inventors discovered that a polymer dispersing agent having a long molecule that prevents aggregation of the nanoparticles through steric inhibition when attached to the surfaces of the nanoparticles is suitable as the dispersing agent, rather than a dispersing agent having a short molecule that has minimal steric inhibition effects when attached to the nanoparticle surfaces.

Furthermore, it is important that the glass transition temperature of the abovementioned polymer dispersing agent be 30° C. or higher. The reason is that when the glass transition temperature of the polymer dispersing agent is 30° C. or higher, it is possible to prevent the polymer dispersing agent from solidifying into a gel and becoming sticky and inconvenient to handle after the solvent is removed in step (2).

The polymer dispersing agent is preferably a polymer in which various lipophilic functional groups and hydrophilic functional groups are attached to the ends of a polymer main chain such as a polyester, an acrylic, or a urethane. The type or admixture ratio of the polymer dispersing agent is appropriately determined according to the type and surface characteristics of the laser-light-absorbent nanoparticles that are to be dispersed. The polymer dispersing agent is generally admixed in a ratio of about 2 to 10 times the weight of the laser-light-absorbent nanoparticles.

The uniformity of dispersion of the nanoparticles in the light-absorbent resin molding ultimately obtained can be maintained by admixing an appropriate quantity of the polymer dispersing agent. Clouding and other defects in the molding according to the degree of affinity between the polymer dispersing agent and the resin as the main component of the light-absorbent resin molding ultimately obtained can be prevented by not adding an excessive quantity of the polymer dispersing agent.

Any method and device for uniformly dispersing the nanoparticles in the resin may be selected insofar as the laser-light-absorbent nanoparticles, the dispersing agent, and the solvent are uniformly dispersed. For example, a bead mill, a ball mill, a sand mill, an ultrasonic dispersing device, or other method or device may be used.

The abovementioned light-absorbent resin composition for laser welding may be diluted with a thermoplastic resin, kneaded, and molded to directly obtain a light-absorbent resin molding. The abovementioned light-absorbent resin composition for laser welding may also be diluted with a thermoplastic resin and kneaded to create a master batch in the form of grains or pellets that include the light-absorbent resin composition for laser welding as the main component, and the master batch may then be further diluted with a thermoplastic resin molding material of the same type as the thermoplastic resin of the master batch, or with a thermoplastic resin molding material having compatibility with the thermoplastic resin of the master batch, kneaded, and molded to obtain the final light-absorbent resin molding.

A ribbon blender, a tumbler, a Nauta mixer, a Henschel mixer, a super mixer, a planetary mixer, or other mixer; or a Banbury mixer, a kneader, rollers, a kneader-ruder, a single-screw extruder, a twin-screw extruder, or other melt-kneader may be used for the abovementioned dilution and kneading. In this dilution and kneading process, stabilizers, lubricants, fillers, viscosity adjusters, conductivity-imparting agents, antioxidants, and release agents; glass fibers, carbon fibers, or other reinforcing agents; and dyes, pigments, and other additives may also be added. However, it is important that the dispersion properties of the laser-light-absorbent nanoparticles be maintained with adequate uniformity in the light-absorbent resin composition for laser welding in all steps. The reason is that when the dispersion properties of the laser-light-absorbent nanoparticles are maintained in the dilution, kneading, and molding steps, there is almost no loss of the initial dispersion uniformity in the subsequent steps.

As mentioned above, the same thermoplastic resin as the polymer dispersing agent, or a compatible thermoplastic resin that differs from the polymer dispersing agent may be used as the thermoplastic resin for diluting the light-absorbent resin composition for laser welding.

Acrylic resin, styrene resin, fluororesin, polycarbonate resin, low-density polyethylene resin, polypropylene resin, polyurethane resin, polyamide resin, polyethylene terephthalate resin, polybutylene terephthalate resin, and other thermoplastic resins are preferred for use as the thermoplastic resin.

Examples of acrylic resins include acrylic acid esters having methyl methacrylate, ethyl methacrylate, propyl methacrylate, or butyl methacrylate as the main raw material and a $C_{1-8}$ alkyl group as needed; and polymers or copolymers in which vinyl acetate, styrene, acrylonitrile, methacrylonitrile, or the like is used as a copolymer component. An example is a copolymer obtained by adding an alkyl acrylate ester or other copolymerizable monomer in a ratio of 0.05 to 50 mol % to 50 to 99.95 mol % of methyl methacrylate.

Examples of styrene resins include polystyrene, acrylonitrile-styrene copolymer, methyl methacrylate-styrene copolymer, acrylonitrile-methyl methacrylate-styrene copolymer, acrylonitrile-butadiene-styrene resin, acrylonitrile-acrylic rubber-styrene resin, acrylonitrile-EPDM-styrene resin, and the like, and a copolymer obtained by adding a copolymerizable monomer in a ratio of 0 to 70 mol % to 30 to 100 mol % of styrene.

Examples of fluororesins include polyfluoroethylene, polydifluoroethylene, polytetrafluoroethylene, ethylene-difluoroethylene copolymer, ethylene-tetrafluoroethylene copolymer, tetrafluoroethylene-perfluoroalkoxyethylene copolymer, and the like.

In the light-absorbent resin molding thus obtained, the content ratio of the nanoparticles of tungsten oxide or composite tungsten oxide in a region that is 3 mm or less from the surface and that constitutes a surface layer is preferably 0.01 $g/m^2$ to 32 $g/m^2$.

The reason that the region in which the content ratio of the nanoparticles of tungsten oxide or composite tungsten oxide is prescribed is the region 3 mm or less from the surface as the surface layer of the light-absorbent resin molding is that the portion that melts and contributes to bonding when the laser is radiated to the light-absorbent resin molding is essentially the surface layer of the light-absorbent resin molding, or the region 3 mm or less from the surface.

When the content ratio of the tungsten oxide or composite tungsten oxide is excessive in the region 3 mm or less from the surface that is the surface layer of the light-absorbent resin molding, the member has an overly dark blue color. Furthermore, during laser irradiation, there is too much locally generated heat, and the resin or the dispersing agent evaporates, gas bubbles form around the welded part, and other problems occur. Conversely, when the content ratio is too low, the laser energy cannot be adequately absorbed during laser irradiation. As a result, even when the laser power is increased, the amount of heat generated by the laser becomes equal between the light-transmitting resin and the light-absorbent resin molding, and both the light-transmitting resin and the light-absorbent resin molding melt and deform, leading to poor bonding and other problems.

In order to prevent these problems, the content ratio of the tungsten oxide or composite tungsten oxide in the region 3 mm or less from the surface as the surface layer of the light-absorbent resin molding is preferably within the range of 0.01 $g/m^2$ to 32 $g/m^2$.

Measurement of the content ratio of the tungsten oxide or composite tungsten oxide in the region 3 mm or less from the surface is performed using the weight ratio of the tungsten oxide or composite tungsten oxide nanoparticles with respect to the weight of the plastic member as the content ratio when the thickness of the plastic member is 3 mm or less, or by obtaining a transmission electron micrograph of a cross-section of the molding, calculating a surface fraction from the surface area of the tungsten oxide or composite tungsten oxide included in the region up to 3 mm from the surface, assuming the nanoparticles to be uniformly included in the molding at this surface fraction to calculate a volume fraction, and using the volume fraction as the content ratio.

The light-absorbent resin molding may also include one or more types of viscosity adjusters, conductivity-imparting agents, antioxidants, stabilizers, lubricants, and fillers; glass fibers, carbon fibers, or other reinforcing materials; and dyes and pigments as needed.

The light-absorbent resin molding may be molded into any shape as needed, and flat shapes, curved shapes, and other complex shapes may also be molded. The thickness of a planar molding may be arbitrarily adjusted as needed from a plate to a film. A resin sheet molded in a planar shape may also be molded by subsequent processing into a sphere or any other shape.

The abovementioned light-absorbent resin molding may be molded by injection molding, extrusion molding, compression molding, rotational molding, or any other molding method. Methods for obtaining a molded article by injection molding, and methods for obtaining a molded article by extrusion molding are particularly preferred. Methods for obtaining plate-shaped and film-shaped molded articles by extrusion molding include a method whereby a molten thermoplastic resin extruded using a T-die or other extruder is drawn while being cooled on a cooling roller.

When a resin molding can be manufactured by casting a monomer solution such as acrylic resin or the like, the abovementioned light-absorbent resin composition for laser welding may be mixed and dissolved in an acrylic syrup starting solution, or a liquid dispersion of the tungsten oxide or composite tungsten oxide nanoparticles may be directly mixed, dissolved, and cast in a molding die, and then formed into a molding by a polymerization process. In this case, the solvent and dispersing agent included in the nanoparticle dispersion is selected according to compatibility with the monomer solution, the initiating agent, the cross-linking agent, and other additives normally included in the acrylic syrup starting solution. The reason is that the solvent and the dispersing agent inhibit the polymerization process of the acrylic polymer, and gaps form in the resin molding as a result.

The tungsten oxide or composite tungsten oxide nanoparticles as the laser-light-absorbent nanoparticles may be included in a state of uniform dispersion throughout the entire light-absorbent resin molding, or may be included in a state of uniform dispersion in a coating film on the surface of the light-absorbent resin molding. A coating film also includes a case in which the laser-light-absorbent nanoparticles are included in a state of uniform dispersion in a surface layer that is formed by co-extrusion used in the case of extrusion sheet molding.

The distribution states of the dispersed nanoparticles are broadly classified as described above according to the method for manufacturing the molding, but when the light-absorbent resin molding is irradiated by the laser, the portion that melts and contributes to bonding is essentially the region 3 mm or less from the surface as the surface layer of the light-absorbent resin molding. Consequently, regardless of the manufacturing method, the region in which the content ratio of the tungsten oxide or composite tungsten oxide nanoparticles is specified as described above is the region 3 mm or less from the surface as the surface layer of the obtained light-absorbent resin molding.

In a method for uniformly dispersing the laser-light-absorbent nanoparticles in a coating film on the surface of the light-absorbent resin molding, a laser-light-absorbent nanoparticle dispersion is first formed in which the abovementioned laser-light-absorbent nanoparticles are dispersed in any solvent using a bead mill, a ball mill, a sand mill, ultrasonic dispersion, or another method, and a binder resin is added to the product, after which the product is applied as a coating on the surface of a substrate, the solvent is evaporated, and the binder resin is cured by a prescribed method, whereby a thin coating film can be formed in which the nanoparticles are dispersed in a medium. The thickness of the coating film is not particularly limited, but a thickness range of about 1 µm to 10 µm is preferred. The coating method is not particularly limited insofar as the surface of the substrate can be evenly coated with the resin that includes the nanoparticles, and examples include bar coating, gravure coating, spray coating, dip coating, screen printing, brush application, and other methods. When the nanoparticles are directly dispersed in a binder resin, there is no need to evaporate the solvent after application on the substrate surface, and such a product is environmentally and commercially preferred.

A UV-curable resin, a heat-curable resin, an electron-curable resin, a normal-temperature-curable resin, a thermoplastic resin, or the like, for example, may be selected as the binder resin according to the purpose.

Specific examples include polyethylene resin, polyvinyl chloride resin, polyvinylidene chloride resin, polyvinyl alcohol resin, polystyrene resin, polypropylene resin, ethylene vinyl acetate copolymer, polyester resin, polyethylene terephthalate resin, fluororesin, polycarbonate resin, acrylic resin, and polyvinyl butyral resin. A binder that uses a metal alkoxide may also be used. Typical examples of the abovementioned metal alkoxide include Si, Ti, Al, Zr, and other alkoxides. An oxide film can be formed by hydrolyzing and heating a binder that uses these metal alkoxides.

The bond surfaces between the light-absorbent resin molding and the light-transmitting resin member that are laser welded may be flat, or a concave surface may be fitted with a convex surface. One or both of the bond surfaces may be coated.

The emission conditions of the emitted laser may be selected as appropriate, but conditions are usually preferred in which the laser output is 5 to 500 W, the scanning speed is in the range of 2 mm/s to 500 mm/s, and the laser-light emission angle is perpendicular to the bond surface.

EXAMPLES

Examples and comparative examples of the present invention will next be specifically described. However, the present invention is not limited by the examples given below.

Example 1

Tungsten hexachloride $WCl_6$ was dissolved in ethanol, thoroughly stirred, and then dried at 110° C. The dried product was then heated at 350° C. while 2% $H_2$ gas in $N_2$ gas as a carrier was fed, and the product was then baked at 800° C. in an argon atmosphere to yield $WO_{2.72}$ nanoparticles. The $WO_{2.72}$ nanoparticles were confirmed to be single-phase by X-ray analysis.

A tungsten oxide $WO_{2.72}$ nanoparticle dispersion (solution A) was prepared by a process in which 5 wt % of the $WO_{2.72}$ nanoparticles, 37.5 wt % of a toluene solution (40% active component) of UG-4030 (solid powder at room temperature; glass transition temperature: 52° C.) styrene/acrylic polymer dispersing agent manufactured by Toagosei (Inc.) as a polymer-based dispersing agent, and 57.5 wt % of toluene were weighed and placed in a paint shaker in which zirconia beads were placed, and the mixture was crushed/dispersed for six hours.

The dispersed particle diameter of the nanoparticles in the particle dispersion (solution A) was 137 nm when measured by a device (ELS-8000, manufactured by Otsuka Electronics Co. (Ltd.)) based on a dynamic light scattering method. The solution A was then diluted using toluene, and the concentration of the laser-light-absorbing agent was set to 0.01 wt %. The toluene-diluted solution of solution A was placed in a glass cell having a thickness of 1 cm, and the transmittance was measured from ultraviolet to near-infrared using a spectrophotometer (U-4000 spectrophotometer, manufactured by Hitachi Seisakusho). The Lambert-Beer law was assumed to operate in the toluene-diluted solution of solution A, and the $WO_{2.72}$ weight-concentration-equivalent weight-absorption coefficient E was calculated at each wavelength using Equation (1) below. The thick solid line in FIG. 1 is a plot of the weight-absorption coefficient $\epsilon$ with respect to the wavelength in the visible/near-infrared region.

$\epsilon$=[log(100/$T$)]/$C$ ($T$: % transmittance at a wavelength $\lambda$; $C$: concentration (g/L) of the laser-light-absorbing agent in the dispersion) (1)

Figure 1:
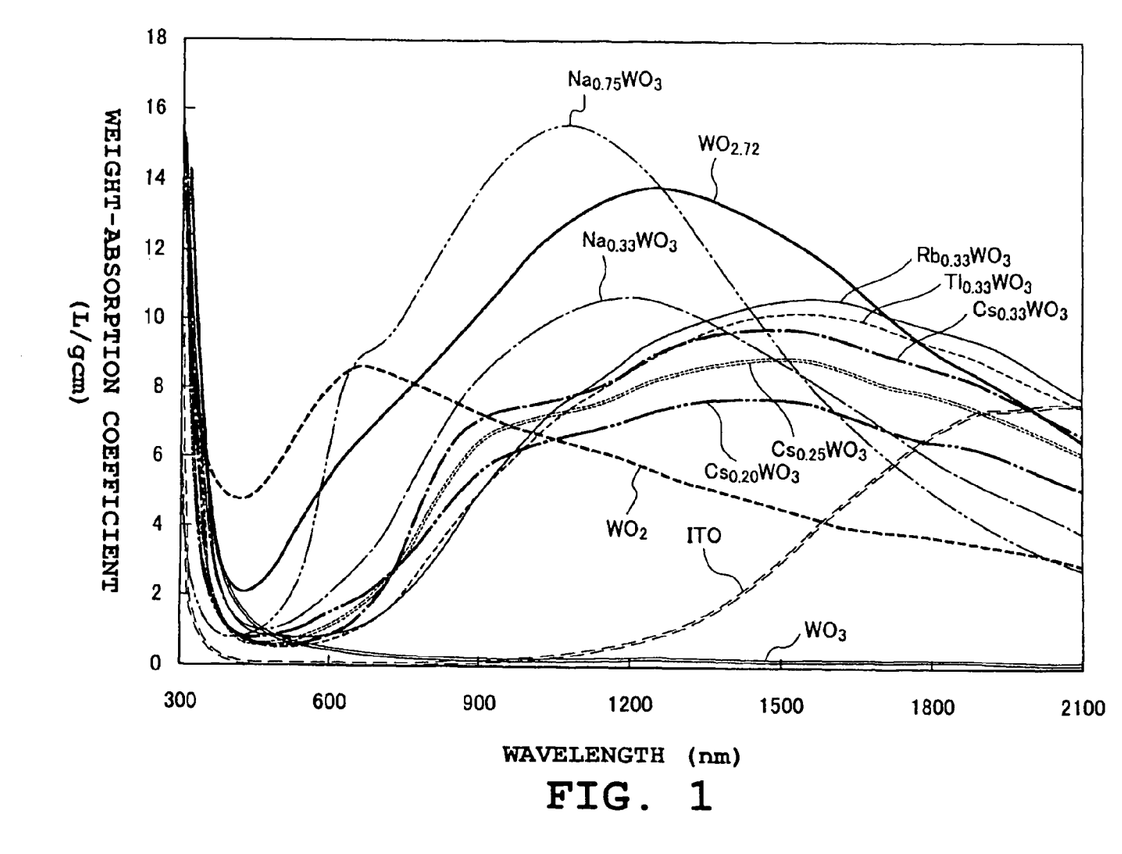
FIG. 1 is a graph showing the relationship between the wavelength of light and the weight-absorption coefficient of each type of nanoparticle dispersion.

As shown in FIG. 1, a large absorption band having a peak near a wavelength of 1250 nm was observed for the $WO_{2.72}$ nanoparticles. Since there also was some absorbance of a visible light component, the $WO_{2.72}$ nanoparticle dispersion had a dark blue color. According to the absorption profile shown in FIG. 1, the $WO_{2.72}$ nanoparticle dispersion was confirmed to be favorable for absorbing laser light from an Nd: YAG laser having a wavelength of 1064 nm or a semiconductor laser having a wavelength of 800 to 1000 nm.

Example 2

The same procedure as in Example 1 was performed, except that the temperature of heating during the feed of H2 gas was changed from 350° C. to 650° C., and $WO_2$ nanoparticles were generated. A toluene dispersion (solution B) of $WO_2$ was prepared according to the same procedure as Example 1. Solution B was diluted using toluene to give a concentration of 0.01 wt % of the laser-light-absorbing agent, and the spectral transmittance was measured, and the calculated weight-absorption coefficient is indicated by the thick dashed line in FIG. 1. The dispersed particle diameter of the nanoparticles in the nanoparticle dispersion (solution B) was 113 nm. Since there also was some absorbance of a visible light component, the dispersion had a dark blue color. According to the absorption profile shown in FIG. 1, the $WO_2$ nanoparticle dispersion was confirmed to be favorable for absorbing laser light from an Nd: YAG laser having a wavelength of 1064 nm, and particularly the laser light from a semiconductor laser having a wavelength of 800 to 1000 nm.

Example 3

Cesium carbonate $Cs_2CO_3$ in the amount of 10.8 g was dissolved in 16.5 g of water, and the mixture was added to 50 g of tungsten oxide $H_2WO_4$, after which the product was dried. The dried product was then heated while 2% $H_2$ gas in $N_2$ gas as a carrier was fed, and the product was baked at a temperature of 800° C. for three hours to yield $Cs_{0.33}WO_3$ nanoparticles. The $Cs_{0.33}WO_3$ nanoparticles were confirmed to be single-phase by X-ray analysis. A composite tungsten oxide nanoparticle dispersion (solution C) was prepared by a process in which 5 wt % of the $Cs_{0.33}WO_3$ nanoparticles, 25 wt % of a polymer-based dispersing agent, and 70 wt % of toluene were weighed and placed in a paint shaker in which $ZrO_2$ beads were placed, and the mixture was crushed/dispersed for six hours. The dispersed particle diameter of the nanoparticles in the nanoparticle dispersion (solution C) was 92 nm when measured. The dispersion solution C was then diluted using toluene, and the concentration of the laser-light-absorbing agent was set to 0.01 wt %. The weight-absorption coefficient calculated in the same manner as in Example 1 is indicated by the thick dotted line in FIG. 1. According to FIG. 1, a broad absorption band that rises from the vicinity of the 600 nm wavelength and has a maximum peak of 9.3 L/gcm near the 1450 nm wavelength was observed for $Cs_{0.33}WO_3$. According to the absorption profile shown in FIG. 1, the $Cs_{0.33}WO_3$ nanoparticle dispersion was confirmed to be favorable for absorbing laser light from an Nd: YAG laser having a wavelength of 1064 nm or a semiconductor laser having a wavelength of 800 to 1000 nm.

Examples 4 Through 9

Alkali metal salts and tungsten oxides were mixed and baked in $N_2/H_2$ gas after drying in the same manner as in Example 3, and $Cs_{0.20}WO_3$ (Example 4), $Cs_{0.25}WO_3$ (Example 5), $Rb_{0.33}WO_3$ (Example 6), $Tl_{0.33}WO_3$ (Example 7), $Na_{0.33}WO_3$ (Example 8), and $Na_{0.75}WO_3$ (Example 9) composite tungsten oxide nanoparticles were obtained. A polymer dispersing agent and toluene were added to the nanoparticles, and the mixtures were placed in a paint shaker in which zirconia beads were used, and the mixtures were crushed and dispersed to obtain the composite tungsten oxide nanoparticle dispersions according to Examples 4 through 9. The dispersions were diluted using toluene so as to give a concentration of 0.01 wt % of the laser-light-absorbing agent, and the transmittance was measured in the same manner as in Example 3. The results of calculating the weight-absorption coefficients are shown in FIG. 1.

The positions and sizes of the peaks for $Cs_{0.20}WO_3$ (Example 4) (thick double-dashed line in FIG. 1), $Cs_{0.25}WO_3$ (Example 5) (double short dashed line in FIG. 1), $Rb_{0.33}WO_3$ (Example 6) (thin solid line in FIG. 1), and $Tl_{0.33}WO_3$ (Example 7) (thin dashed line in FIG. 1) indicated wavelength dependency similar to that of $Cs_{0.33}WO_3$ (Example 3). The rise in the absorption band began near 450 nm for $Na_{0.33}WO_3$ (Example 8) (thin dotted line in FIG. 1) and $Na_{0.75}WO_3$ (Example 9) (thin double dotted line in FIG. 1), and the peak positions were also observed at short wavelengths near 1100 to 1200 nm. According to these profiles, the abovementioned nanoparticle dispersions were shown to be extremely favorable for absorbing laser light from an Nd: YAG laser having a wavelength of 1064 nm or a semiconductor laser having a wavelength of 800 to 1000 nm.

Comparative Example 1

The same procedure was performed as in Example 1, except that heat treatment at 350° C. in a feed of 2% $H_2$ gas using $N_2$ gas as a carrier was omitted, and baking at 800° C. was performed directly in the atmosphere to generate $WO_3$ nanoparticles. The $WO_3$ was confirmed to be single-phase by X-ray analysis.

A toluene dispersion of the $WO_3$ nanoparticles was prepared in the same manner as Example 1, and the calculated weight-absorption coefficient is indicated by the narrow double line in FIG. 1. The nanoparticle diameter of the dispersion was 110 nm. According to this absorption profile, the $WO_3$ nanoparticle dispersion had almost no absorption of near-infrared wavelengths and most visible wavelengths. Consequently, the nanoparticle dispersion according to Comparative Example 1 was determined to have no laser-light absorbing capability for an Nd: YAG laser having a wavelength of 1064 nm, or a semiconductor laser having a wavelength of 800 to 1000 nm.

Comparative Example 2

The ITO nanoparticle dispersion according to Comparative Example 2 was prepared by a process in which 20 wt % of ITO nanoparticles manufactured by Sumitomo Metal Mining Co. (Ltd.), 35 wt % of a polymer-based dispersing agent, and 45 wt % of toluene were weighed, placed in a paint shaker in which zirconia beads were placed, and crushed/dispersed for six hours. The dispersed particle diameter of the nanoparticles in the ITO nanoparticle dispersion was 140 nm. The ITO nanoparticle dispersion was then diluted using toluene, and the concentration of the laser-light-absorbing agent was set to 0.1 wt %. The weight-absorption coefficient calculated in the same manner as in Example 1 is indicated by the thin double long-dashed line in FIG. 1. As is apparent from the profile shown in FIG. 1, the ITO nanoparticle dispersion according to Comparative Example 2 has characteristics whereby wavelengths from about 1000 nm to long near-infrared wavelengths are absorbed, and absorption is possible for an Nd:YAG laser having a wavelength of 1064 nm. However, the weight-absorption coefficient of the ITO nanoparticles according to Comparative Example 2 was extremely small, being approximately 0.35 L/gcm at a wavelength of 1064 nm. It was also apparent from comparing the weight-absorption coefficients at the wavelength of 1064 nm between the ITO nanoparticles of Comparative Example 2 and the nanoparticles of Examples 1 through 9 that approximately one-eighteenth of the effect was obtained in comparison to the $WO_2$ value of 6.55 L/gcm, which was the smallest weight-absorption coefficient. The difference was even larger in the region relating to a semiconductor laser having a wavelength of 800 to 1000 nm. Accordingly, it was apparent that a quantity of the ITO nanoparticles two to three or more orders of magnitude greater than the amount of the nanoparticles of Examples 1 through 9 would be necessary in order to obtain the same effects as the nanoparticles of Examples 1 through 9 using the ITO nanoparticles of Comparative Example 2.

Example 10

Solution A of Example 1 was heated to evaporate the toluene solvent component, and a light-absorbent resin composition for laser welding (powder D) in the form of a solid powder was obtained in which 25 wt % of tungsten oxide $WO_{2.72}$ nanoparticles were uniformly dispersed in a polymer dispersing agent. This light-absorbent resin composition for laser welding (powder D) in the amount of 9 weight parts, and 1 weight part of colorless, transparent acrylic resin pellets were mixed, the mixture was melt-kneaded at 280° C. using a twin-screw extruder, and the extruded strand was cut into pellets to yield a master batch including the light-absorbent component having a $WO_{2.72}$ nanoparticle concentration of 2.5 wt %.

The master batch and acrylic resin pellets were placed in a blender and uniformly mixed, after which a T-die was used to extrusion mold a plate 1 (light-absorbent resin molding) having a thickness of 1.0 mm as an acrylic resin test plate in which tungsten oxide nanoparticles $WO_{2.72}$ were uniformly dispersed at a concentration of 0.075 wt % throughout the resin.

The size of the plate 1 was 5 cm in width by 9 cm in length, but the thickness was divided into 1 mm, 2 mm, and 3 mm portions every 3 cm in the length direction.

The content ratio of the $WO_{2.72}$ nanoparticles in the 1-mm thick portions in the plate 1 was calculated by (Volume of 1 m² of the acrylic resin plate)×(Density in g/cm³ of the acrylic resin)×(Nanoparticle weight concentration %) (100 cm×100 cm×0.1 cm×1.2 g/cm×0.0075=0.90 g/m²).

The optical characteristics of the 1-mm thick portions in the plate 1 were measured using a spectrophotometer (U-4000 spectrophotometer, manufactured by Hitachi Seisakusho). As a result, the visible light transmittance was 85%, the transmittance at 940 nm was 42%, and it was apparent that an adequately visible brightness was present, and that semiconductor laser light having a wavelength of 940 nm was adequately absorbed, as shown in FIG. 2.

A plate having the same size as plate 1 but not including tungsten oxide nanoparticles was then fabricated as plate 2 (light-transmitting resin molding).

Plate 1 including tungsten oxide nanoparticles, and plate 2 not including tungsten oxide nanoparticles were placed back-to-back so as to fit together at the 1-mm thick portions, the plates were adhered using a crimping fixture, and the assembly was irradiated by laser light for 3 cm in the width direction (5 cm). Laser light irradiation was performed using a semiconductor laser (wavelength: 940 nm) manufactured by Fine Device Co. having an output of 30 W, at a focal radius of 0.8 mm and a scanning speed of 16 mm/s. Heat was generated in the plate 1 including the light-absorbent nanoparticles, and melting occurred in conjunction with the laser light irradiation, the plate 2 was also melted through propagation of heat, the plates melted together, and the plates were cured by cooling to complete the bond. The bond was maintained even when the crimping fixture was released.

The outward appearance was visually observed, and the product was evaluated as having a problem-free glossy surface with no uneven color.

The strength of the bonded part was estimated by grasping the two bonded plates in both hands and applying upward force to the center part with the ends directed downward. The integrity of the bonded part was apparently maintained even when significant force was applied. Regarding the bond strength, bonds that were maintained even under significant force are indicated as "o," bonded parts that were bonded but separated with light force are indicated as "x," and bonds that were incomplete are indicated as "xx" in the evaluations shown in FIG. 2.

Comparative Example 3

The $WO_{2.72}$ nanoparticle dispersion according to Comparative Example 3 was created in the same manner as in Example 1, except that the room-temperature liquid polymer dispersing agent XG-4000 (glass transition temperature: −61° C.) manufactured by Toagosei was used instead of the styrene/acrylic-based polymer dispersing agent UG-4030 (solid powder at room temperature; glass transition temperature: 52° C.) manufactured by Toagosei that was used in Example 1. A $WO_{2.72}$ nanoparticle dispersion having a dispersed particle diameter of 147 nm was created. The product was then heated to evaporate the toluene, and the light-absorbent resin composition for laser welding according to Comparative Example 3 was obtained in which the $WO_{2.72}$ nanoparticles in a ratio of 25 wt % were uniformly dispersed in the polymer dispersing agent. However, the light-absorbent resin composition for laser welding according to Comparative Example 3 formed a sticky gel, and since proper weighing and mixing with clear pellets in a subsequent step were difficult to perform, the composition was discarded, and processing was ended.

Example 11

In the same manner as in Example 10, a tungsten oxide $WO_2$ nanoparticle dispersion was heated to evaporate the toluene solvent component, and a light-absorbent resin composition for laser welding that included 25 wt % of the nanoparticle ($WO_2$ nanoparticles) component was obtained. Transparent pellets of acrylic resin were mixed with the light-absorbent resin composition for laser welding, and the mixture was melt-kneaded in a twin-screw extruder and extruded to produce a master batch including 2.5 wt % of the light-absorbent nanoparticle ($WO_2$ nanoparticles) component. The melt-kneading temperature was appropriately adjusted in the range of 160 to 300° C. according to the resins. The master batch was furthermore diluted using the same clear resin pellets, and the plate 1 according to Example 11 was created as an acrylic resin test plate in which the tungsten oxide $WO_2$ nanoparticles were uniformly dispersed in the entire resin at a concentration of 0.075 wt %. (The plate 1 of Example 11 was the same size as the plate 1 of Example 10.)

A 300 to 2600 nm transmission profile was measured using a spectrophotometer for the plate 1 of Example 11, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by laser light. The content ratio of $Cs_{0.33}WO_3$ nanoparticles in the 1-mm thick portion of the plate 1 was 0.90 g/m² in this case. The evaluation results are shown in FIG. 2.

As is apparent from FIG. 2, when this light-absorbent resin molding in which composite tungsten oxide $WO_2$ nanoparticles are added is used, the visible light transmittance is 34%, the transmittance at 940 nm is 27%, a pleasing weld is created in which a glossy surface is maintained while visible light is adequately transmitted to maintain high transparency, and it is possible to perform laser welding in which there are no problems in the appearance or strength of the bonded part.

Example 12

In the same manner as in Example 10, a composite tungsten oxide $Cs_{0.33}WO_3$ nanoparticle dispersion was heated to evaporate the toluene solvent component, and a light-absorbent resin composition for laser welding that included 25 wt % of the nanoparticle ($Cs_{0.33}WO_3$ nanoparticles) component was obtained. Transparent pellets of polycarbonate resin were mixed with the light-absorbent resin composition for laser welding, and the mixture was melt-kneaded in a twin-screw extruder and extruded to produce a master batch including 2.5 wt % of the light-absorbent nanoparticle ($Cs_{0.33}WO_3$ nanoparticles) component. The melt-kneading temperature was appropriately adjusted in the range of 160 to 300° C. according to the resins. The master batch was furthermore diluted using the same clear resin pellets, and the plate 1 according to Example 12 was created as a polycarbonate resin test plate in which the composite tungsten oxide $Cs_{0.33}WO_3$ nanoparticles were uniformly dispersed in the entire resin at a concentration of 0.075 wt %.

A 300 to 2600 nm transmission profile was measured using a spectrophotometer for the plate 1 of Example 12, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by laser light. The content ratio of $Cs_{0.33}WO_3$ nanoparticles in the 1-mm thick portion of the plate 1 was 0.90 g/m² in this case. The evaluation results are shown in FIG. 2.

As is apparent from FIG. 2, when this light-absorbent resin molding in which composite tungsten oxide $Cs_{0.33}WO_3$ nanoparticles are added is used, the visible light transmittance is 85%, the transmittance at 940 nm is 33%, a pleasing weld is created in which a glossy surface is maintained while visible light is adequately transmitted to maintain high transparency, and it is possible to perform laser welding in which there are no problems in the appearance or strength of the bonded part.

Example 13

In the same manner as in Example 10, a composite tungsten oxide $Cs_{0.33}WO_3$ nanoparticle dispersion was heated to evaporate the toluene solvent component, and a light-absorbent resin composition for laser welding that included 25 wt % of the nanoparticle ($Cs_{0.33}WO_3$ nanoparticles) component was obtained. Transparent pellets of polycarbonate resin were mixed with the light-absorbent resin composition for laser welding, and the mixture was melt-kneaded in a twin-screw extruder and extruded to produce a master batch including 2.5 wt % of the light-absorbent nanoparticle ($Cs_{0.33}WO_3$ nanoparticles) component. The melt-kneading temperature was appropriately adjusted in the range of 160 to 300° C. according to the resins. The master batch was furthermore diluted using the same clear resin pellets, and the plate 1 according to Example 13 was created as a polycarbonate resin test plate in which the composite tungsten oxide $Cs_{0.33}WO_3$ nanoparticles were uniformly dispersed in the entire resin at a concentration of 0.28 wt %.

A 300 to 2600 nm transmission profile was measured using a spectrophotometer for the plate 1 of Example 13, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by laser light. The content ratio of $Cs_{0.33}WO_3$ nanoparticles in the 1-mm thick portion of the plate 1=light-absorbent resin molding was 3.40 g/m² in this case. The evaluation results are shown in FIG. 2.

As is apparent from FIG. 2, when this light-absorbent resin molding in which composite tungsten oxide $Cs_{0.33}WO_3$ nanoparticles are added is used, the visible light transmittance is 63%, the transmittance at 940 nm is 2%, a pleasing weld is created in which a glossy surface is maintained while visible light is adequately transmitted to maintain high transparency, and it is possible to perform laser welding in which there are no problems in the appearance or strength of the bonded part.

Example 14

In the same manner as in Example 10, a composite tungsten oxide $Cs_{0.20}WO_3$ nanoparticle dispersion was heated to evaporate the toluene solvent component, and a light-absorbent resin composition for laser welding according to Example 14 that included 25 wt % of the nanoparticle ($Cs_{0.20}WO_3$ nanoparticles) component was obtained. Transparent pellets of polycarbonate resin were mixed with the light-absorbent resin composition for laser welding, and the mixture was melt-kneaded in a twin-screw extruder and extruded to produce a master batch according to Example 14 including 2.5 wt % of the light-absorbent nanoparticle ($Cs_{0.20}WO_3$ nanoparticles) component. The melt-kneading temperature was appropriately adjusted in the range of 160 to 300° C. according to the resins. The master batch was furthermore diluted using the same clear resin pellets, and the plate 1 according to Example 14 was created as a polycarbonate resin test plate in which the composite tungsten oxide $Cs_{0.20}WO_3$ nanoparticles were uniformly dispersed in the entire resin at a concentration of 0.08 wt %.

A 300 to 2600 nm transmission profile was measured using a spectrophotometer for the plate 1 of Example 14, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by semiconductor laser light. The content ratio of $Cs_{0.20}WO_3$ nanoparticles in the 1-mm thick portion of the plate 1=light-absorbent resin molding was 0.96 g/m² in this case. The evaluation results are shown in FIG. 2.

As is apparent from FIG. 2, when this light-absorbent resin molding in which composite tungsten oxide $Cs_{0.20}WO_3$ nanoparticles are added is used, the visible light transmittance is 79%, the transmittance at 940 nm is 34%, a pleasing weld is created in which a glossy surface is maintained while visible light is adequately transmitted to maintain high transparency, and it is possible to perform laser welding in which there are no problems in the appearance or strength of the bonded part.

Example 15

In the same manner as in Example 10, a composite tungsten oxide $Cs_{0.25}WO_3$ nanoparticle dispersion was heated to evaporate the toluene solvent component, and a light-absorbent resin composition for laser welding that included 25 wt % of the nanoparticle ($Cs_{0.25}WO_3$ nanoparticles) component was obtained. Transparent pellets of polycarbonate resin were mixed with the light-absorbent resin composition for laser welding, and the mixture was melt-kneaded in a twin-screw extruder and extruded to produce a master batch including 2.5 wt % of the light-absorbent nanoparticle ($Cs_{0.25}WO_3$ nanoparticles) component. The melt-kneading temperature was appropriately adjusted in the range of 160 to 300° C. according to the resins. The master batch was furthermore diluted using the same clear resin pellets, and the plate 1 according to Example 15 was created as a polycarbonate resin test plate in which the composite tungsten oxide $Cs_{0.25}WO_3$ nanoparticles were uniformly dispersed in the entire resin at a concentration of 0.08 wt %.

A 300 to 2600 nm transmission profile was measured using a spectrophotometer for the plate 1 of Example 15, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by semiconductor laser light. The content ratio of $Cs_{0.25}WO_3$ nanoparticles in the 1-mm thick portion of the plate 1=light-absorbent resin molding was 0.96 g/m² in this case. The evaluation results are shown in FIG. 2.

As is apparent from FIG. 2, when this light-absorbent resin molding in which composite tungsten oxide $Cs_{0.25}WO_3$ nanoparticles are added is used, the visible light transmittance is 83%, the transmittance at 940 nm is 35%, a pleasing weld is created in which a glossy surface is maintained while visible light is adequately transmitted to maintain high transparency, and it is possible to perform laser welding in which there are no problems in the appearance or strength of the bonded part.

Example 16

In the same manner as in Example 10, a composite tungsten oxide $Rb_{0.33}WO_3$ nanoparticle dispersion was heated to evaporate the toluene solvent component, and a light-absorbent resin composition for laser welding that included 25 wt % of the nanoparticle ($Rb_{0.33}WO_3$ nanoparticles) component was obtained. Transparent pellets of acrylic resin were mixed with the light-absorbent resin composition for laser welding, and the mixture was melt-kneaded in a twin-screw extruder and extruded to produce a master batch including 2.5 wt % of the light-absorbent nanoparticle ($Rb_{0.33}WO_3$ nanoparticles) component. The melt-kneading temperature was appropriately adjusted in the range of 160 to 300° C. according to the resins. The master batch was furthermore diluted using the same clear resin pellets, and the plate 1 according to Example 16 was created as an acrylic resin test plate in which the composite tungsten oxide $Rb_{0.33}WO_3$ nanoparticles were uniformly dispersed in the entire resin at a concentration of 0.07 wt %.

A 300 to 2600 nm transmission profile was measured using a spectrophotometer for the plate 1 of Example 16, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by semiconductor laser light. The content ratio of $Rb_{0.33}WO_3$ nanoparticles in the 1-mm thick portion of the plate 1 was 0.84 g/m² in this case. The evaluation results are shown in FIG. 2.

As is apparent from FIG. 2, when this light-absorbent resin molding in which composite tungsten oxide $Rb_{0.33}WO_3$ nanoparticles are added is used, the visible light transmittance is 85%, the transmittance at 940 nm is 29%, a pleasing weld is created in which a glossy surface is maintained while visible light is adequately transmitted to maintain high transparency, and it is possible to perform laser welding in which there are no problems in the appearance or strength of the bonded part.

Example 17

In the same manner as in Example 10, a composite tungsten oxide $Tl_{0.33}WO_3$ nanoparticle dispersion was heated to evaporate the toluene solvent component, and a light-absorbent resin composition for laser welding that included 25 wt % of the nanoparticle ($Tl_{0.33}WO_3$ nanoparticles) component was obtained. Transparent pellets of acrylic resin were mixed with the light-absorbent resin composition for laser welding, and the mixture was melt-kneaded in a twin-screw extruder and extruded to produce a master batch including 2.5 wt % of the light-absorbent nanoparticle ($Tl_{0.33}WO_3$ nanoparticles) component. The melt-kneading temperature was appropriately adjusted in the range of 160 to 300° C. according to the resins. The master batch was furthermore diluted using the same clear resin pellets, and the plate 1 according to Example 17 was created as an acrylic resin test plate in which the composite tungsten oxide $Tl_{0.33}WO_3$ nanoparticles were uniformly dispersed in the entire resin at a concentration of 0.075 wt %.

A 300 to 2600 nm transmission profile was measured using a spectrophotometer for the plate 1 of Example 17, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by semiconductor laser light. The content ratio of $Tl_{0.33}WO_3$ nanoparticles in the 1-mm thick portion of the plate 1=light-absorbent resin molding was 0.90 g/m² in this case. The evaluation results are shown in FIG. 2.

As is apparent from FIG. 2, when this light-absorbent resin molding in which composite tungsten oxide $Tl_{0.33}WO_3$ nanoparticles are added is used, the visible light transmittance is 84%, the transmittance at 940 nm is 39%, a pleasing weld is created in which a glossy surface is maintained while visible light is adequately transmitted to maintain high transparency, and it is possible to perform laser welding in which there are no problems in the appearance or strength of the bonded part.

Example 18

In the same manner as in Example 10, a composite tungsten oxide $Na_{0.33}WO_3$ nanoparticle dispersion was heated to evaporate the toluene solvent component, and a light-absorbent resin composition for laser welding that included 25 wt % of the nanoparticle ($Na_{0.33}WO_3$ nanoparticles) component was obtained. Transparent pellets of polyethylene terephthalate resin were mixed with the light-absorbent resin composition for laser welding, and the mixture was melt-kneaded in a twin-screw extruder and extruded to produce a master batch including 2.5 wt % of the light-absorbent nanoparticle ($Na_{0.33}WO_3$ nanoparticles) component. The melt-kneading temperature was appropriately adjusted in the range of 160 to 300° C. according to the resins. The master batch was furthermore diluted using the same clear resin pellets, and the plate 1 according to Example 18 was created as a polyethylene terephthalate resin test plate in which the composite tungsten oxide $Na_{0.33}WO_3$ nanoparticles were uniformly dispersed in the entire resin at a concentration of 0.075 wt %.

A 300 to 2600 nm transmission profile was measured using a spectrophotometer for the plate 1 of Example 18, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by semiconductor laser light. The content ratio of $Na_{0.33}WO_3$ nanoparticles in the 1-mm thick portion of the plate 1 light-absorbent resin molding was 0.90 g/m² in this case. The evaluation results are shown in FIG. 2.

As is apparent from FIG. 2, when this light-absorbent resin molding in which composite tungsten oxide $Na_{0.33}WO_3$ nanoparticles are added is used, the visible light transmittance is 79%, the transmittance at 940 nm is 18%, a pleasing weld is created in which a glossy surface is maintained while visible light is adequately transmitted to maintain high transparency, and it is possible to perform laser welding in which there are no problems in the appearance or strength of the bonded part.

Example 19

In the same manner as in Example 10, a composite tungsten oxide $Na_{0.75}WO_3$ nanoparticle dispersion was heated to evaporate the toluene solvent component, and a light-absorbent resin composition for laser welding that included 25 wt % of the nanoparticle ($Na_{0.75}WO_3$ nanoparticles) component was obtained. Transparent pellets of polyethylene terephthalate resin were mixed with the light-absorbent resin composition for laser welding, and the mixture was melt-kneaded in a twin-screw extruder and extruded to produce a master batch including 2.5 wt % of the light-absorbent nanoparticle ($Na_{0.75}WO_3$ nanoparticles) component. The melt-kneading temperature was appropriately adjusted in the range of 160 to 300° C. according to the resins. The master batch was furthermore diluted using the same clear resin pellets, and the plate 1 according to Example 19 was created as a polyethylene terephthalate resin test plate in which the composite tungsten oxide $Na_{0.75}WO_3$ nanoparticles were uniformly dispersed in the entire resin at a concentration of 0.04 wt %.

A 300 to 2600 nm transmission profile was measured using a spectrophotometer for the plate 1 of Example 19, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by semiconductor laser light. The content ratio of $Na_{0.75}WO_3$ nanoparticles in the 1-mm thick portion of the plate 1=light-absorbent resin molding was 0.48 g/m² in this case. The evaluation results are shown in FIG. 2.

As is apparent from FIG. 2, when this light-absorbent resin molding in which composite tungsten oxide $Na_{0.75}WO_3$ nanoparticles are added is used, the visible light transmittance is 56%, the transmittance at 940 nm is 4%, a pleasing weld is created in which a glossy surface is maintained while visible light is adequately transmitted to maintain high transparency, and it is possible to perform laser welding in which there are no problems in the appearance or strength of the bonded part.

Example 20

In the same manner as in Example 10, a tungsten oxide $WO_2$ nanoparticle dispersion was heated to evaporate the toluene solvent component, and a light-absorbent resin composition for laser welding that included 25 wt % of the nanoparticle ($WO_2$ nanoparticles) component was obtained. Transparent pellets of polystyrene resin were mixed with the light-absorbent resin composition for laser welding, and the mixture was melt-kneaded in a twin-screw extruder and extruded to produce a master batch including 2.5 wt % of the light-absorbent nanoparticle ($WO_2$ nanoparticles) component. The melt-kneading temperature was appropriately adjusted in the range of 160 to 300° C. according to the resins. The master batch was furthermore diluted using the same clear resin pellets, and the plate 1 according to Example 20 was created as a polystyrene resin test plate in which the tungsten oxide $WO_2$ nanoparticles were uniformly dispersed in the entire resin at a concentration of 0.08 wt %.

A 300 to 2600 nm transmission profile was measured using a spectrophotometer for the plate 1 of Example 20, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by semiconductor laser light. The content ratio of $WO_2$ nanoparticles in the 1-mm thick portion of the plate 1 light-absorbent resin molding was 0.96 g/m² in this case. The evaluation results are shown in FIG. 2.

As is apparent from FIG. 2, when this light-absorbent resin molding in which tungsten oxide $WO_2$ nanoparticles are added is used, the visible light transmittance is 30%, the transmittance at 940 nm is 32%, a pleasing weld is created in which a glossy surface is maintained while visible light is adequately transmitted to maintain high transparency, and it is possible to perform laser welding in which there are no problems in the appearance or strength of the bonded part.

Example 21

In the same manner as in Example 10, a tungsten oxide $WO_{2.72}$ nanoparticle dispersion was heated to evaporate the toluene solvent component, and a light-absorbent resin composition for laser welding that included 25 wt % of the nanoparticle ($WO_{2.72}$ nanoparticles) component was obtained. Transparent pellets of polyamide resin were mixed with the light-absorbent resin composition for laser welding, and the mixture was melt-kneaded in a twin-screw extruder and extruded to produce a master batch including 2.5 wt % of the light-absorbent nanoparticle ($WO_{2.72}$ nanoparticles) component. The melt-kneading temperature was appropriately adjusted in the range of 160 to 300° C. according to the resins. The master batch was furthermore diluted using the same clear resin pellets, and the plate 1 according to Example 21 was created as a polyamide resin test plate in which the tungsten oxide $WO_{2.72}$ nanoparticles were uniformly dispersed in the entire resin at a concentration of 0.08 wt %.

A 300 to 2600 nm transmission profile was measured using a spectrophotometer for the plate 1 of Example 21, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by semiconductor laser light. The content ratio of $WO_{2.72}$ nanoparticles in the 1-mm thick portion of the plate 1=light-absorbent resin molding was 0.96 g/m$^2$ in this case. The evaluation results are shown in FIG. 2.

As is apparent from FIG. 2, when this light-absorbent resin molding in which tungsten oxide $WO_{2.72}$ nanoparticles are added is used, the visible light transmittance is 71%, the transmittance at 940 nm is 35%, a pleasing weld is created in which a glossy surface is maintained while visible light is adequately transmitted to maintain high transparency, and it is possible to perform laser welding in which there are no problems in the appearance or strength of the bonded part.

Example 22

In the same manner as in Example 10, a tungsten oxide $WO_{2.72}$ nanoparticle dispersion was heated to evaporate the toluene solvent component, and a light-absorbent resin composition for laser welding that included 25 wt % of the nanoparticle ($WO_{2.72}$ nanoparticles) component was obtained. Transparent pellets of polyethylene resin were mixed with the light-absorbent resin composition for laser welding, and the mixture was melt-kneaded in a twin-screw extruder and extruded to produce a master batch including 2.5 wt % of the light-absorbent nanoparticle ($WO_{2.72}$ nanoparticles) component. The melt-kneading temperature was appropriately adjusted in the range of 160 to 300° C. according to the resins. The master batch was furthermore diluted using the same clear resin pellets, and the plate 1 according to Example 22 was created as a polyethylene resin test plate in which the tungsten oxide $WO_{2.72}$ nanoparticles were uniformly dispersed in the entire resin at a concentration of 0.12 wt %.

A 300 to 2600 nm transmission profile was measured using a spectrophotometer for the plate 1 of Example 22, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by semiconductor laser light. The content ratio of $WO_{2.72}$ nanoparticles in the 1-mm thick portion of the plate 1=light-absorbent resin molding was 1.44 g/m$^2$ in this case. The evaluation results are shown in FIG. 2.

As is apparent from FIG. 2, when this light-absorbent resin molding in which tungsten oxide $WO_{2.72}$ nanoparticles are added is used, the visible light transmittance is 48%, the transmittance at 940 nm is 18%, a pleasing weld is created in which a glossy surface is maintained while visible light is adequately transmitted to maintain high transparency, and it is possible to perform laser welding in which there are no problems in the appearance or strength of the bonded part.

Example 23

In the same manner as in Example 10, a tungsten oxide $WO_{2.72}$ nanoparticle dispersion was heated to evaporate the toluene solvent component, and a light-absorbent resin composition for laser welding that included 25 wt % of the nanoparticle ($WO_{2.72}$ nanoparticles) component was obtained. Transparent pellets of ethylene-tetrafluoroethylene copolymer resin were mixed with the light-absorbent resin composition for laser welding, and the mixture was melt-kneaded in a twin-screw extruder and extruded to produce a master batch including 2.5 wt % of the light-absorbent nanoparticle ($WO_{2.72}$ nanoparticles) component. The melt-kneading temperature was appropriately adjusted in the range of 160 to 300° C. according to the resins. The master batch was furthermore diluted using the same clear resin pellets, and the plate 1 according to Example 23 was created as an ethylene-tetrafluoroethylene copolymer resin test plate in which the tungsten oxide $WO_{2.72}$ nanoparticles were uniformly dispersed in the entire resin at a concentration of 0.10 wt %.

A 300 to 2600 nm transmission profile was measured using a spectrophotometer for the plate 1 of Example 23, and the visible light transmittance and the transmittance at 940 nm are shown in FIG. 2. The plate 1 and a resin test plate 2 (of the same size as the plate 2 described in Example 10) not including the light-absorbent nanoparticles were adhered together at the 1-mm thick portions and irradiated by semiconductor laser light. The content ratio of $WO_{2.72}$ nanoparticles in the 1-mm thick portion of the plate 1=light-absorbent resin molding was 1.2 g/m$^2$ in this case. The evaluation results are shown in FIG. 2.

As is apparent from FIG. 2, when this light-absorbent resin molding in which tungsten oxide $WO_{2.72}$ nanoparticles are added is used, the visible light transmittance is 53%, the transmittance at 940 nm is 28%, a pleasing weld is created in which a glossy surface is maintained while visible light is adequately transmitted to maintain high transparency, and it is possible to perform laser welding in which there are no problems in the appearance or strength of the bonded part.

Example 24

A nanoparticle dispersion (solution C) of composite tungsten oxide including 5 wt % of $Cs_{0.33}WO_3$ nanoparticles, 25 wt % of a polymer-based dispersing agent, and 70 wt % of toluene was created in the same manner as in Example 3. The dispersion in the amount of 80 wt % and 20 wt % of an ultraviolet-curable resin (UV-3701, solid content 100%, manufactured by Toagosei) for hard coating were mixed to form a coating solution. The coating solution was applied on an acrylic resin plate having a thickness of 3 mm using a bar coater, and a film was formed. The acrylic substrate was dried for 30 seconds at 60° C. to evaporate the solvent, after which curing was performed using a high-pressure mercury lamp, and the plate 1 according to Example 24 was created as an acrylic substrate having a coating film.

The coating film thickness of the plate 1 according to Example 24 was measured as 8 μm using a probe-type film thickness meter. Based on the solid content ratio, the nanoparticle concentration in the film was 16.7 wt %, and the content ratio of $Cs_{0.33}WO_3$ nanoparticles to a thickness of 8 μm was 1.6 g/m$^2$. When the optical characteristics of the plate 1 according to Example 24 were measured, it was apparent that the visible light transmittance was 71%, and that light in the visible region was adequately transmitted. The plate 1 and a resin test plate 2 (of the same size as the plate 2 described in Example 10) not including the light-absorbent nanoparticles were adhered together via the coating surface of the plate 1 and irradiated by semiconductor laser light. The evaluation results are shown in FIG. 2.

As is apparent from FIG. 2, when this light-absorbent resin molding coated with composite tungsten oxide $Cs_{0.33}WO_3$ nanoparticles is used, the visible light transmittance is 71%, the transmittance at 940 nm is 6%, a pleasing weld is created in which a glossy surface is maintained while visible light is adequately transmitted to maintain high transparency, and it is possible to perform laser welding in which there are no problems in the appearance or strength of the bonded part.

Example 25

A nanoparticle dispersion solution C of composite tungsten oxide $Cs_{0.33}WO_3$ was created, the dispersion solution was heated to evaporate the toluene solvent component, and a light-absorbent resin composition for laser welding was obtained that included 16.7 wt % of the nanoparticle ($Cs_{0.33}WO_3$ nanoparticles) component. The light-absorbent resin composition for laser welding was thoroughly mixed with and dissolved in a methylisobutylketone solvent, and a methylisobutylketone dispersion including 10 wt % of the nanoparticle component was created. The dispersion in the amount of 80 wt % and 20 wt % of an ultraviolet-curable resin (solid content 100%) for hard coating were mixed to form a coating solution. The coating solution was applied on an acrylic resin plate having a thickness of 3 mm using a bar coater, and a film was formed. The acrylic substrate was dried for 30 seconds at 60° C. to evaporate the solvent, after which curing was performed using a high-pressure mercury lamp, and the plate 1 according to Example 25 was created as an acrylic substrate having a coating film.

The coating film thickness of the plate 1 according to Example 25 was measured as 8 μm using a probe-type film thickness meter. Based on the solid content ratio, the nanoparticle concentration in the film was 28.5 wt %, and the content ratio of $Cs_{0.33}WO_3$ nanoparticles to a thickness of 5 μm was 2.7 g/m². When the optical characteristics of the plate 1 according to Example 25 were measured, it was apparent that the visible light transmittance was 65%, and that light in the visible region was adequately transmitted. The plate 1 and a resin test plate 2 (of the same size as the plate 2 described in Example 10) not including the light-absorbent nanoparticles were adhered together via the coating surface of the plate 1 and irradiated by semiconductor laser light. The evaluation results are shown in FIG. 2.

As is apparent from FIG. 2, when this light-absorbent resin molding coated with tungsten oxide $WO_{2.72}$ nanoparticles is used, the visible light transmittance is 65%, the transmittance at 940 nm is 2%, a pleasing weld is created in which a glossy surface is maintained while visible light is adequately transmitted to maintain high transparency, and it is possible to perform laser welding in which there are no problems in the appearance or strength of the bonded part.

Comparative Example 4

Using the $WO_3$ toluene dispersion created in Comparative Example 1, the dispersion was heated in the same manner as in Example 10 to evaporate the toluene solvent component and create a $WO_3$ nanoparticle dispersion powder including 25 wt % of the nanoparticle component, transparent pellets of acrylic resin were mixed with the dispersion powder, and the mixture was melt-kneaded at 280° C. in a twin-screw extruder and extruded to produce a master batch including 2.5 wt % of $WO_3$. The master batch was furthermore diluted using acrylic resin pellets, and the plate 1 according to Comparative Example 4 was created as an acrylic resin test plate that included 0.1 wt % of the $WO_3$ nanoparticles.

The content ratio of the $WO_3$ nanoparticles in the 1-mm thick portion of the plate 1 of Comparative Example 4 was 1.2 g/m². The plate had a high visible light transmittance of 84%, but a large transmittance of 92% at 940 nm was also apparent. The acrylic resin test plate including 0.1 wt % of the $WO_3$ nanoparticles, and a resin test plate 2 (of the same size as the plate 2 described in Example 10) not including the $WO_3$ nanoparticles were adhered together and irradiated by semiconductor laser light. In this case, heat generation and welding did not occur upon irradiation with laser light, and an absence of functioning as a laser-light-absorbing resin was confirmed.

Comparative Example 5

The plate 1 according to Comparative Example 5 was created as an acrylic resin test plate including 0.24 wt % of ITO in the same manner as in Comparative Example 3 using the ITO toluene dispersion created in Comparative Example 2.

The content ratio of ITO nanoparticles in the 1-mm thick portion of the plate 1 of Comparative Example 5 was 28.8 g/m². Although the ITO nanoparticle content was high, the 940-nm transmittance was 73%.

The acrylic resin test plate including 0.24 wt % of ITO, and a resin test plate 2 (of the same size as the plate 2 described in Example 10) not including the $WO_3$ nanoparticles were adhered together and irradiated by semiconductor laser light. In this case, although welding was induced by the laser light irradiation, the weld strength was low, and it was apparent that the two plates were easily separated.

Comparative Example 6

Nanoparticles of $WO_{2.72}$ were obtained by subjecting $WO_3$ nanoparticles to adequate grain growth for an increased duration of heating in air at 800° C., and then reducing the $WO_3$ nanoparticles in a stream of 5% $H_2/N_2$ gas. The nanoparticles were crushed and dispersed in a paint shaker for five minutes, and the grain size was measured as 1200 nm. The plate 1 according to Comparative Example 6 was created as an acrylic resin plate including 0.1 wt % of the $WO_{2.72}$ nanoparticles obtained using the $WO_3$ nanoparticles.

Due to an excessive grain size, the plate 1 of Comparative Example 6 had weak absorbance of near-infrared wavelengths, and although the visible light transmittance was 70%, the 940 nm transmittance was 75%. The content ratio of $WO_{2.72}$ nanoparticles in the 1-mm thick portion of the plate 1 of Comparative Example 6 was 1.2 g/m².

The acrylic resin test plate including 0.1 wt % of $WO_{2.72}$ nanoparticles, and a resin test plate 2 (of the same size as the plate 2 described in Example 10) not including the $WO_{2.72}$ nanoparticles were adhered together and irradiated by semiconductor laser light. In this case, although welding was induced by the laser light irradiation, the weld strength was low, and it was apparent that the two plates were easily separated, as in Comparative Example 4.

Comparative Example 7

The plate 1 according to Comparative Example 7 was created as an acrylic resin plate including a high concentration of 2.9 wt % of the $Cs_{0.33}WO_3$ nanoparticles using the $Cs_{0.33}WO_3$ nanoparticles that were obtained in Example 3.

The content ratio of $Cs_{0.33}WO_3$ nanoparticles in the 1-mm thick portion of the plate 1 of Comparative Example 7 was 34.8 g/m². The plate was almost black and transmitted almost no visible light, and it was apparent that the plate could not be used as a transparent, light-absorbent resin molding.

The acrylic resin test plate including 2.9 wt % of $Cs_{0.33}WO_3$ nanoparticles, and a resin test plate 2 (of the same size as the plate 2 described in Example 10) not including the $WO_3$ nanoparticles were adhered together and irradiated by semiconductor laser light. In this case, there was excessive heat generation and melting due to the laser light, bubbling was observed along the surface in the region scanned by the laser, and the outward appearance was also poor.

Comparative Example 8

The $Cs_{0.33}WO_3$ nanoparticles obtained in Example 3 in the amount of 1 weight part were mixed without modification with 9 weight parts of clear acrylic resin pellets in a blender, the mixture was melted and kneaded in a twin-screw extruder, and the extruded strand was cut into pellets to yield an acrylic resin master batch that included 2.5 wt % of the $Cs_{0.33}WO_3$ nanoparticles. The master batch was further diluted using clear pellets, and the plate 1 of Comparative Example 8 was created as an acrylic resin test plate including 0.075 wt % of $Cs_{0.33}WO_3$ nanoparticles.

The content ratio of $Cs_{0.33}WO_3$ nanoparticles in the 1-mm thick portion of the plate 1 of Comparative Example 8 was 0.90 g/m². Subtle color irregularities were observed in the plate 1.

The acrylic resin test plate including 0.075 wt % of $Cs_{0.33}WO_3$ nanoparticles, and a resin test plate 2 (of the same size as the plate 2 described in Example 10) not including the $WO_3$ nanoparticles were adhered together and irradiated by semiconductor laser light. In this case, although welding was induced by the laser irradiation, the weld strength was lower than usual, and the two plates were easily separated as a result.

What is claimed is:

1. A light-absorbent resin composition for laser welding, comprising laser light absorbent nanoparticles and a polymer dispersing agent that has a glass transition temperature of 30° C. or higher,
    wherein the laser-light-absorbent nanoparticles are at least one of nanoparticles of tungsten oxide indicated by the general formula $W_yO_z$, wherein W is tungsten, O is oxygen, and $2.0<z/y<3.0$, and nanoparticles of composite tungsten oxide indicated by the general formula $M_xW_yO_z$, wherein M is one or more elements selected from the group consisting of hydrogen, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001<x/y<1$; and $2.0<z/y<3.0$, and the light-absorbent resin composition for laser welding is a solid powder at room temperature,
    wherein the polymer dispersing agent is included in a ratio of 2 to 10 times the weight of the laser light absorbent nanoparticles, and a content ratio of the nanoparticles of tungsten oxide or the composite tungsten oxide in a region that is 3 mm or less from a surface and that constitutes a surface layer of the light-absorbent resin molding is 0.01 g/m² or higher and 32 g/m² or less.

2. The light-absorbent resin composition for laser welding according to claim 1, wherein an average grain size of the tungsten oxide or composite tungsten oxide nanoparticles is 1000 nm or less.

3. A light-absorbent resin molding molded by a process in which the light-absorbent resin composition for laser welding according to claim 1 is diluted by a thermoplastic resin and the polymer dispersing agent included in the light-absorbent resin composition for laser welding, and kneaded.

4. The light-absorbent resin molding according to claim 3, wherein the thermoplastic resin is one or more resins selected from the group consisting of acrylic resin, polycarbonate resin, styrene resin, low-density polyethylene resin, polypropylene resin, polyurethane resin, polyimide resin, polyethylene terephthalate resin, polybutylene terephthalate resin, and fluororesin.

5. A light-absorbent resin molding in which the light-absorbent resin molding according to claim 3 an absorbance maximum at a wavelength of 600 to 1800 nm.

6. A light-absorbent resin molding molded by a process in which the light-absorbent resin composition for laser welding according to claim 1 is diluted by a thermoplastic resin and the polymer dispersing agent included in the light-absorbent resin composition for laser welding, and kneaded, and
    wherein the molded light-absorbent resin molding is in the shape of a plate or a film.

7. A light-absorbent resin molding in which the light-absorbent resin composition for laser welding according to claim 1 is diluted by a binder and applied as a coating on a surface of a substrate.

8. The light-absorbent resin composition for laser welding according to claim 1, wherein the polymer dispersing agent prevents aggregation of the laser light absorbent nanoparticles through steric inhibition when attached to the surfaces of the laser light absorbent nanoparticles.

9. A method for manufacturing a light-absorbent resin molding comprising steps of:
    dispersing laser-light-absorbent nanoparticles and a polymer dispersing agent having a glass transition temperature of 30° C. or higher in a solvent to form a dispersion solution,
    heating the dispersion solution to evaporate the solvent from the dispersion solution and to obtain light-absorbent resin composition for laser welding being a solid powder at room temperature, wherein the polymer dispersing agent is included in a ratio of 2 to 10 times the weight of the laser light absorbent nanoparticles,
    mixing the light-absorbent resin composition for laser welding with a thermoplastic resin to knead this mixture,
    molding the mixture to form the light-absorbent resin molding, wherein the laser-light-absorbent nanoparticles are at least one of nanoparticles of tungsten oxide indicated by the general formula $W_yO_z$, wherein W is tungsten, O is oxygen, and $2.0<z/y<3.0$, and nanoparticles of composite tungsten oxide indicated by the general formula $M_xW_yO_z$, wherein M is one or more elements selected from the group consisting of hydrogen, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, B, F, P, S, Se, Br, Te, Ti, Nb, V, Mo, Ta, Re, Be, Hf, Os, Bi, and I; W is tungsten; O is oxygen; $0.001<x/y<1$; and $2.0<z/y<3.0$, and the light-absorbent resin composition for laser welding is a solid powder at room temperature,
    a content ratio of the nanoparticles of tungsten oxide or the composite tungsten oxide in a region that is 3 mm or less from a surface and that constitutes a surface layer of the light-absorbent resin molding is 0.01 g/m² or higher and 32 g/m² or less; and
    performing kneading and molding to manufacture the light-absorbent resin molding.

* * * * *